(12) United States Patent
Kang

(10) Patent No.: US 8,009,416 B2
(45) Date of Patent: Aug. 30, 2011

(54) RETAINING APPARATUS FOR DATA STORAGE DEVICE

(75) Inventor: Sheng Kang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 94 days.

(21) Appl. No.: 12/542,349

(22) Filed: Aug. 17, 2009

(65) Prior Publication Data

US 2010/0302722 A1    Dec. 2, 2010

(30) Foreign Application Priority Data

May 31, 2009    (CN) .......................... 2009 1 0302779

(51) Int. Cl.
G06F 1/16    (2006.01)

(52) U.S. Cl. ......... 361/679.38; 361/679.33; 361/679.39; 361/726; 312/223.1; 312/223.2; 369/75.11

(58) Field of Classification Search ............. 361/679.33, 361/679.34, 679.38
See application file for complete search history.

(56) References Cited

U.S. PATENT DOCUMENTS

| | | | | |
|---|---|---|---|---|
| 5,463,527 A * | 10/1995 | Hager et al. | ............. | 361/679.34 |
| 6,002,658 A * | 12/1999 | Aso et al. | ...................... | 720/651 |
| 6,067,225 A * | 5/2000 | Reznikov et al. | ......... | 361/679.31 |
| 6,075,695 A * | 6/2000 | Konno et al. | ............ | 361/679.31 |
| 6,122,165 A * | 9/2000 | Schmitt et al. | ............ | 361/679.31 |
| 6,166,901 A * | 12/2000 | Gamble et al. | ........... | 361/679.34 |
| 6,233,143 B1 * | 5/2001 | Gamble et al. | ........... | 361/679.34 |
| 6,381,139 B1 * | 4/2002 | Sun | ............................... | 361/725 |
| 6,525,933 B2 * | 2/2003 | Eland | ....................... | 361/679.42 |
| 6,603,657 B2 * | 8/2003 | Tanzer et al. | ............ | 361/679.33 |
| 7,495,902 B2 * | 2/2009 | Connelly et al. | .......... | 361/679.35 |
| 7,511,953 B2 * | 3/2009 | Tao et al. | .................. | 361/679.39 |
| 7,559,132 B2 * | 7/2009 | Sri-Jayantha et al. | ..... | 29/603.03 |
| 7,667,925 B2 * | 2/2010 | Kim et al. | .................. | 360/97.02 |
| 7,729,112 B2 * | 6/2010 | Atkins | ....................... | 361/679.34 |
| 7,733,641 B2 * | 6/2010 | Olesiewicz et al. | ...... | 361/679.34 |
| 7,817,413 B2 * | 10/2010 | Peng et al. | ............... | 361/679.33 |
| 2003/0206402 A1 * | 11/2003 | Tsuyuki et al. | ............... | 361/725 |
| 2004/0190266 A1 * | 9/2004 | Chung | .......................... | 361/724 |
| 2005/0237709 A1 * | 10/2005 | Huang | .......................... | 361/685 |
| 2007/0211422 A1 * | 9/2007 | Liu et al. | ....................... | 361/685 |
| 2009/0129009 A1 * | 5/2009 | Zhang et al. | ............. | 361/679.34 |

* cited by examiner

*Primary Examiner* — Jinhee Lee
*Assistant Examiner* — Anthony Q Edwards
(74) *Attorney, Agent, or Firm* — Altis Law Group, Inc.

(57) ABSTRACT

A retaining apparatus for a data storage device includes a tray, a gasket and a fastener. The tray defines a receiving space for receiving the data storage device. The tray includes a front wall and a side wall. A tongue is located on the side wall. The gasket is attached to the tongue. The gasket is capable of absorbing shock from the tray to the data storage device. The fastener is inserted through the gasket and the tongue into the receiving space to retain the data storage device.

20 Claims, 5 Drawing Sheets

RETAINING APPARATUS FOR DATA STORAGE DEVICE

BACKGROUND

1. Technical Field

The disclosure generally relates to a retaining apparatus for data storage devices, especially to a retaining apparatus with a tray for receiving and retaining at least one data storage device.

2. Description of Related Art

Usually, a data storage device, such as a hard disk drive is simply screwed to a computer chassis. This conventional mounting means can be complex, difficult and waste time during installation. In addition, in use, vibration of the data storage device may cause the screws to come loose and may result in damage to the data storage device. Understandably, some attempts have been taken to introduce a mounting apparatus for a data storage device without screws.

DETAILED DESCRIPTION

Figure 1:
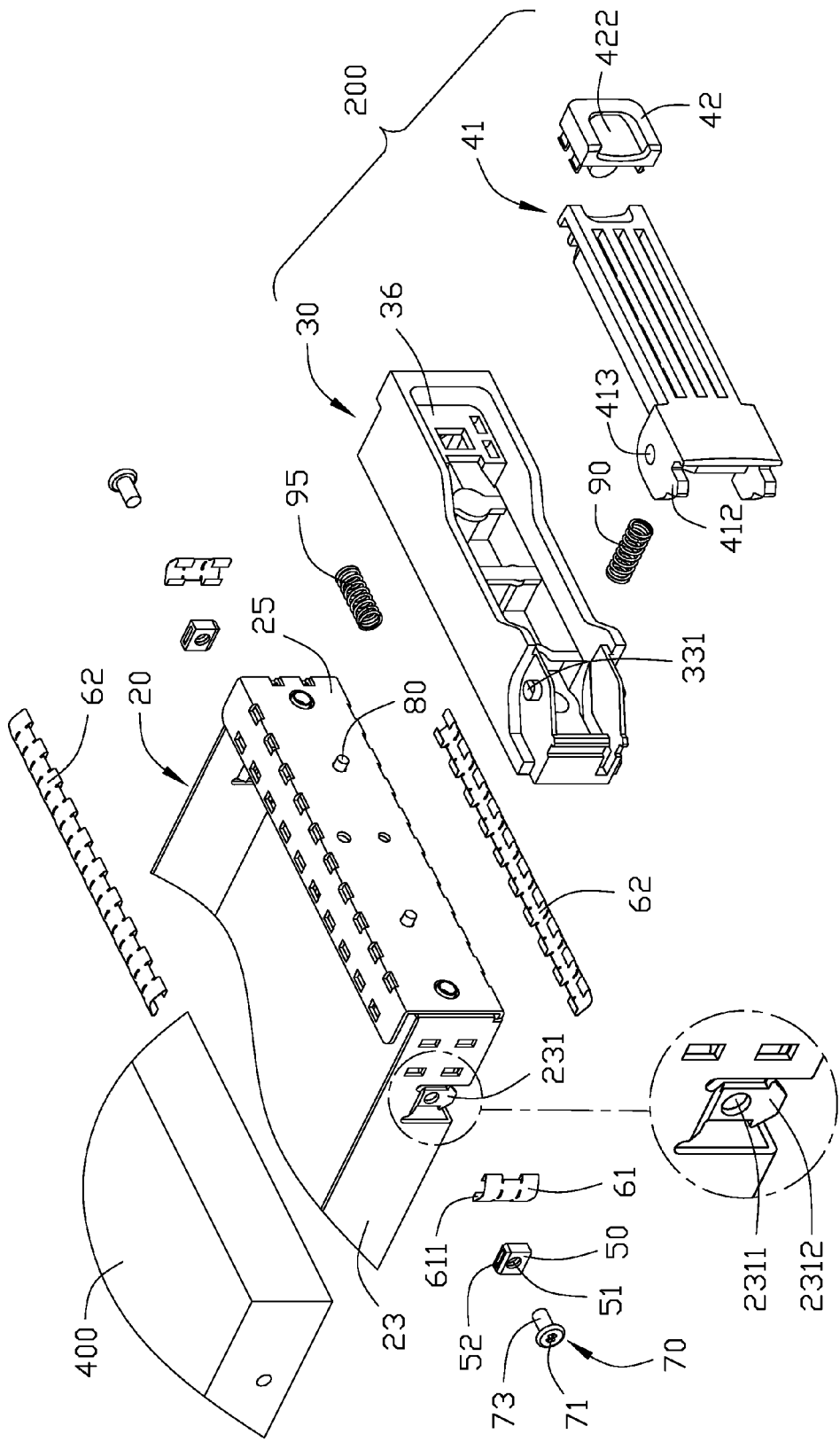
FIG. 1 is an exploded, isometric view of a retaining apparatus.
Figure 2:
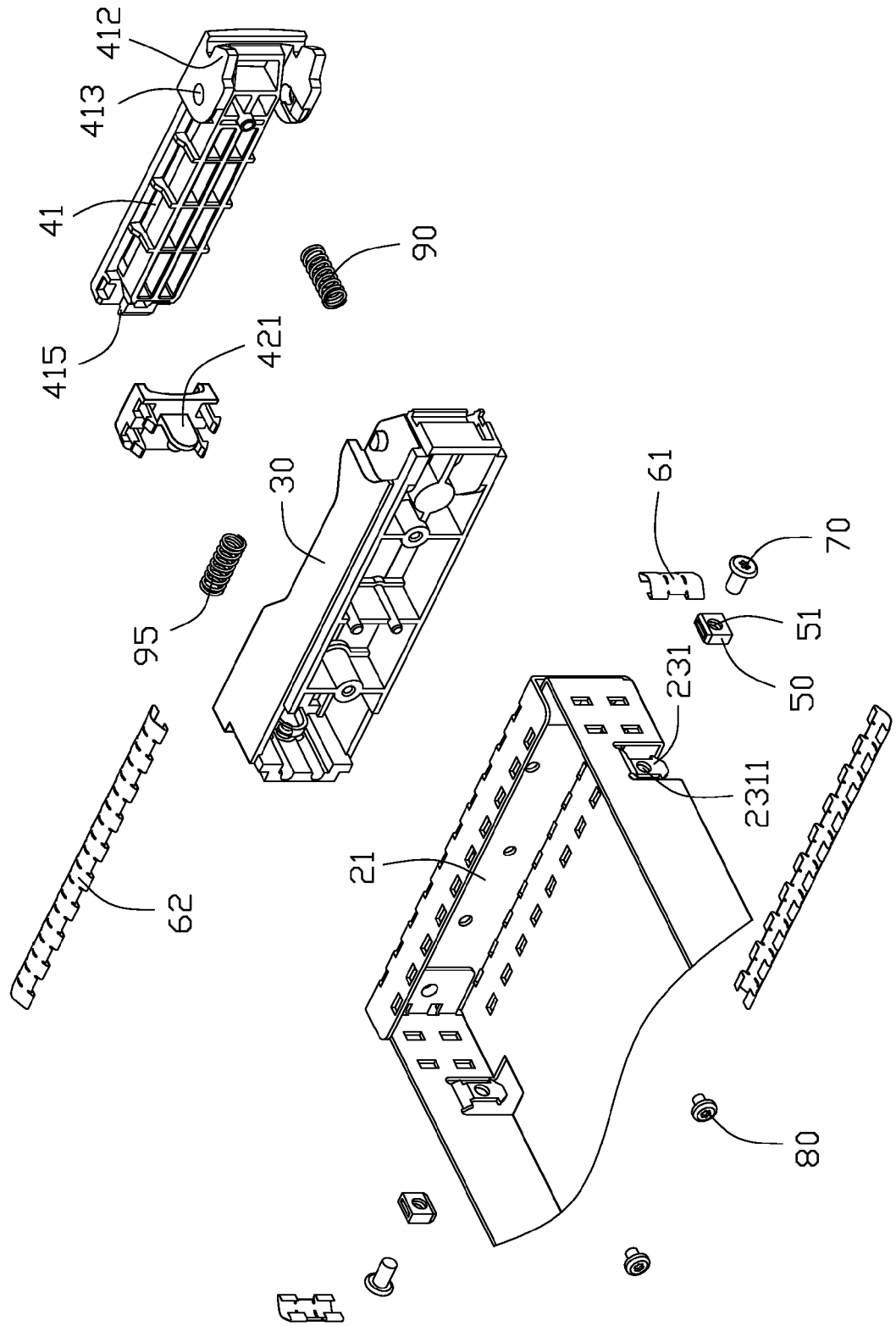
FIG. 2 is similar to FIG. 1, but showing in another aspect.
Figure 5:
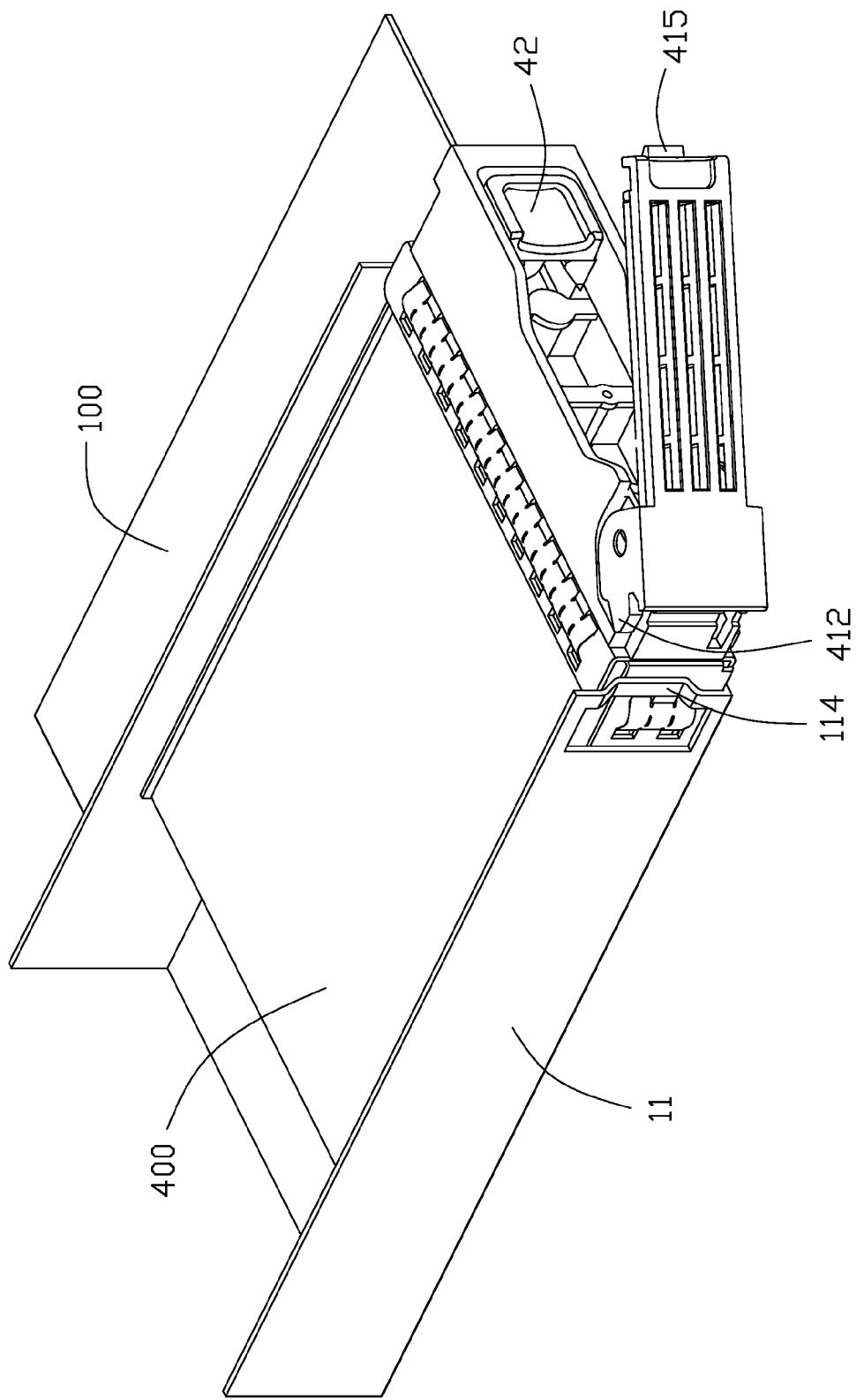
FIG. 5 is similar to FIG. 4, but showing the retaining apparatus disengaged from the bracket.

Referring to FIG. 1, FIG. 2, and FIG. 5, a bracket 100 is used in a computer or an electronic device for mounting at least one retaining apparatus for a data storage device 400. The bracket 100 includes two parallel side plates 11. A slide channel is defined between the two side plates 11 for receiving the retaining apparatus. Each side plate 11 has a vertical baffle 114. The baffle 114 is slightly recessed into the slide channel.

Referring to FIG. 1 and FIG. 2, the retaining apparatus includes a tray 20 and a retaining device 200. The tray 20 has a front wall 21 and two parallel side walls 23. Each side wall 23 defines a plane perpendicular to the front wall 21. The tray 20 defines a receiving space for receiving the data storage device 400. A tongue 231 is vertically formed on each side wall 23. The tongue 231 has an arrow-shaped head portion 2312 at a distal end of the tongue 231. A mounting hole 2311 is defined in the tongue 231. The tongue 231 resides at an inner side of the side wall 23. A first resilient shielding clip 61 is attached to the side wall 23 of the tray 20. The first resilient shielding clip 61 has a plurality of teeth to clasp onto the side wall 23.

A rubber gasket 50 is provided to attach to the tongue 231. The gasket 50 defines a through slot 52 corresponding to the tongue 231, so that the gasket 50 is attachable about the tongue 231. A mounting hole 51 is defined in the gasket 50 corresponding to the mounting hole 2313 of the tongue 231.

A fastener 70 is inserted through the gasket 50 and the tongue 231 into the receiving space to retain the data storage device 400. The fastener 70 includes a head portion 71 and a neck portion 73. The head portion 71 is located out of the plane of the side wall 23 facing to the data storage device 400. The head portion 71 abuts against an outer side of the gasket and the neck portion extends through the gasket and the tongue.

A U-shaped connecting member 25 is attached to the front wall 21 of the tray 20. Two second shielding clips 62 are correspondingly attached to a top side and a bottom side of the connecting member 25. The shielding clips 62 are made from flake metal for providing electromagnetic interference (EMI) shielding.

The retaining device 200 includes a base member 30, an arm member 41 and a blocking member 42. A pair of pivot pins 331 and a restricting portion 36 are located on the base member 30. A pivot axis is aligned with the two pivot pins 331. A fastener 80 is provided to secure the tray 20 to the base member 30.

The arm member 41 defines a pair of pivot holes 413 at a first end of the arm member 41 corresponding to the pivot pins 331. The arm member 41 has a retaining portion 412 formed at a distal portion of the first end. A protrusion 415 extends from a second end of the arm member 41. The second end opposites to the first end. A coil spring 90 is located between the base member 30 and the arm member 41, and provides an ejection force to the arm member 41 to rotate the arm member 41 away from the base member 30.

The blocking member 42 is movably attached to the base member 30. The blocking member 42 is mounted and restricted to/in the restricting portion 36 of the base member 30. The blocking member 42 is capable of blocking the protrusion 415 of the arm member 41. A recess 422 is defined in the blocking member 42 to facilitate the operation of the blocking member 42. The blocking member 42 has a tab 421 extending towards the base member 30. A coil spring 95 is located between the base member 30 and the tab 421 to bias the blocking member 42 along the first direction in a blocking state.

Figure 3:
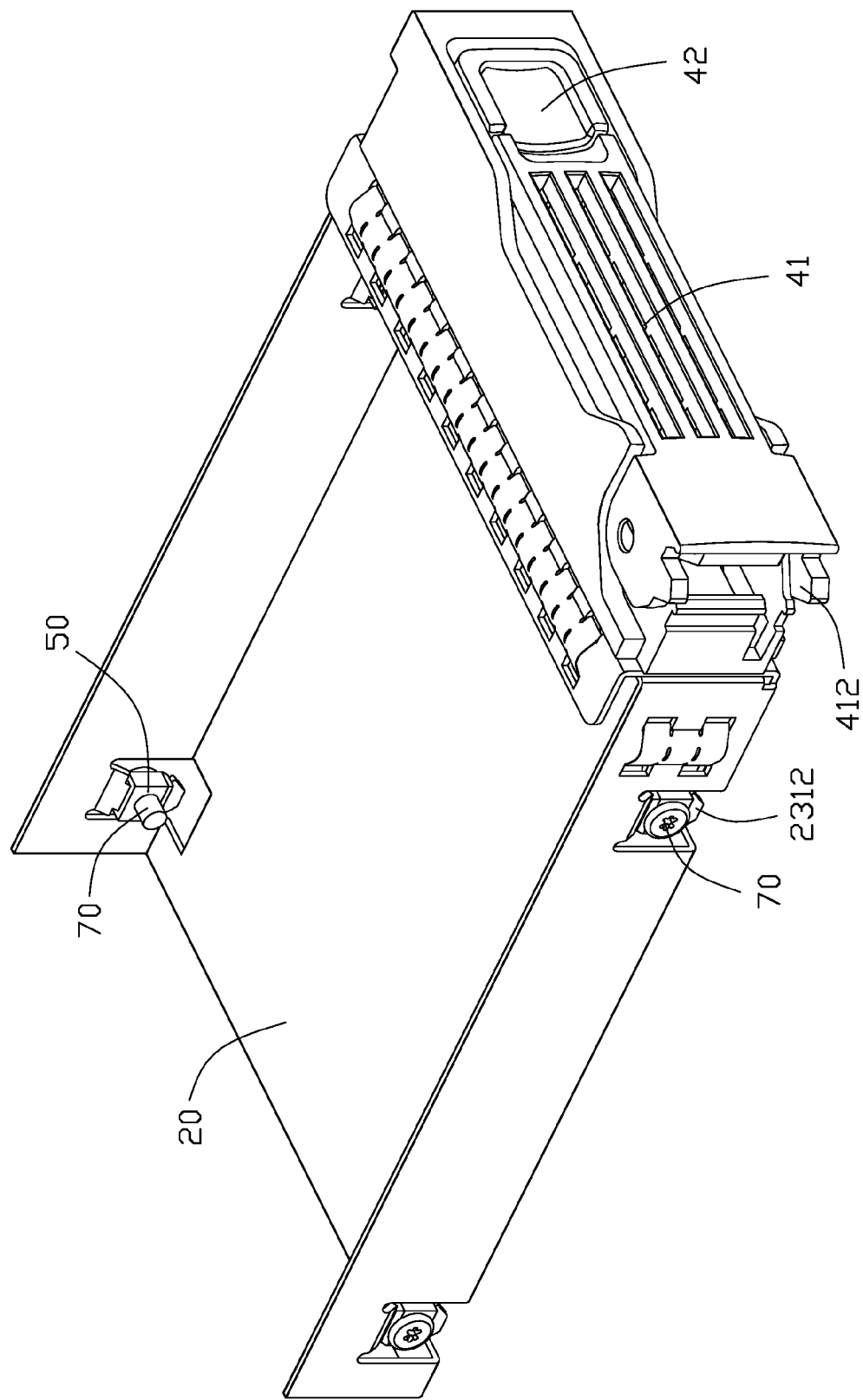
FIG. 3 is an assembled view of FIG. 1.

Referring to FIG. 3, when assembling the retaining apparatus, the gasket 50 is attached around the tongue 231. The fastener 70 extends through the gasket 50 and the tongue 231 to retain the data storage device 400 (not shown). The base member 30 is mounted to the front wall 21 of the tray 20 with the connecting member 25 located between the base member 30 and the tray 20. The first shielding clips 61 and the second shielding clips 62 are secured to the tray 20 and the connecting member 25. The arm member 41 is pivotably fixed to the base member 30 about the pivot axis and the spring 90 is located between the base member 30 and the arm member 41. The blocking member 42 is movably mounted to the base member 30, and the spring 95 is located between the base member 30 and blocking member 52.

Figure 4:
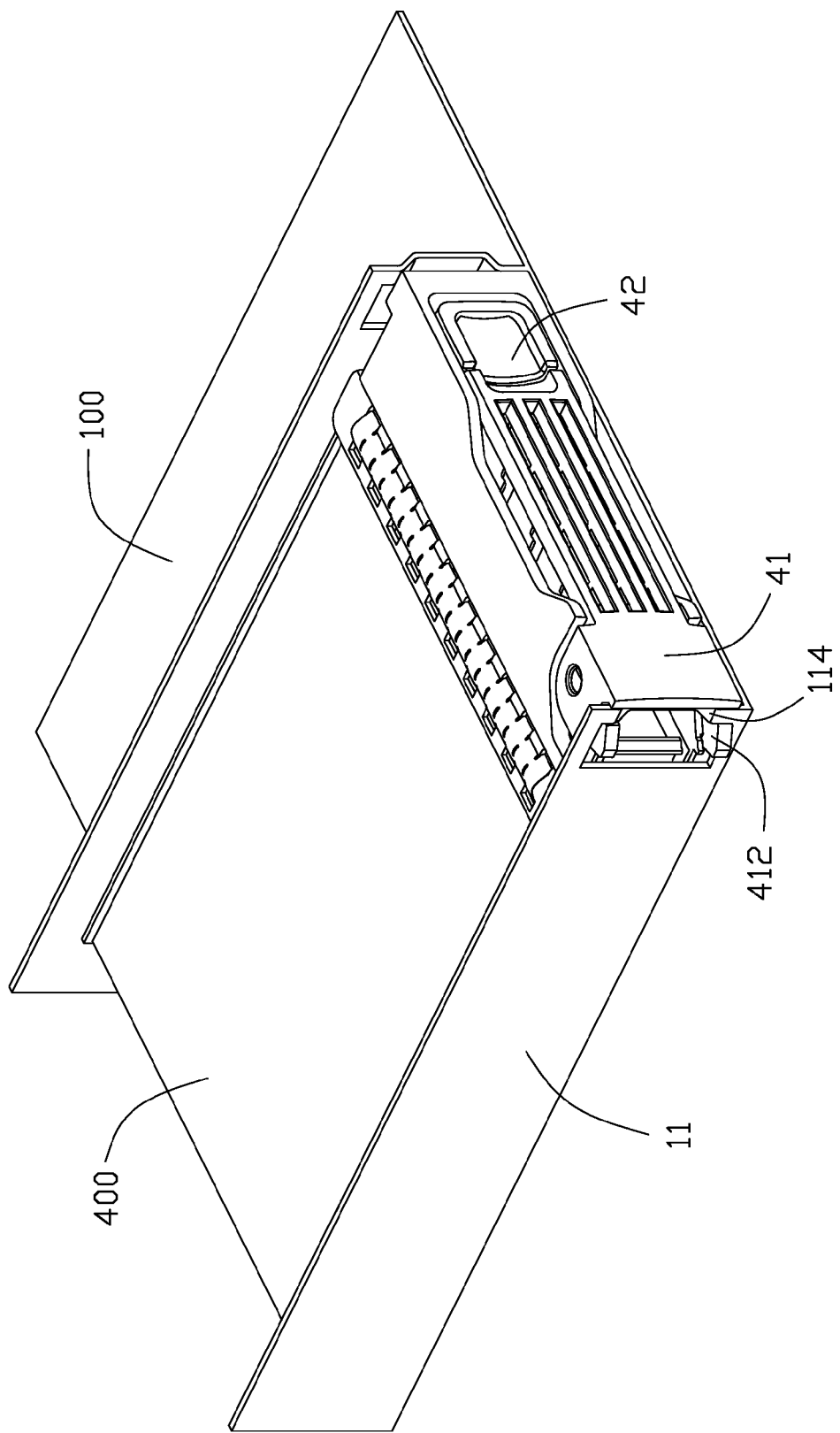
FIG. 4 is a pre-assembled view of the retaining apparatus and a bracket.

Referring to FIG. 4 and FIG. 5, when mounting the retaining apparatus into the bracket 100, the arm member 41 is angled from the base member 30. The tray 20 and the retaining device 200 are completely slid into the slide channel of the bracket 100. Then the arm member 51 is rotated towards the base member 40, thus the retaining portion 412 gradually engages with the baffle 114. When the second end of the arm member 41 reaches the base member 30, the protrusion 415 pushes the blocking member 42 to move sideways. The blocking member 42 moves back to the original position and blocks the arm member 41 from rotating outwardly. The spring 90 is compressed. The retaining apparatus is then mounted to the bracket 100.

When removing the retaining apparatus from the bracket 100, the blocking member 42 is laterally moved. The arm member 42 rotates outwardly due to the resilient force of the spring 90. The retaining portion 412 is disengaged from the baffle 114. The retaining apparatus then is capable of being moved out of the bracket 100.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A retaining apparatus for a data storage device, comprising:
   a tray defining a receiving space for receiving the data storage device, the tray comprising a front wall and a side wall, a tongue located on the side wall;
   a gasket attached to the tongue, the gasket being capable of absorbing shock from the tray to the data storage device;
   a fastener being inserted through the gasket and the tongue into the receiving space to retain the data storage device;
   a base member attached to the tray;
   an arm member pivotally attached to the base member; and
   a blocking member movably attached to the base member capable of blocking the arm member; wherein the blocking member is movable on the base member between a first position and a second position; in the first position, the arm member is locked in the base member; in the second position, the arm member is unlocked in the base member; the arm member is configured to push the blocking member to move sideways in a first direction from the first position to the second position; and the arm member is locked in the base member and the blocking member is configured to move in a second direction, that is opposite to the first direction, from the second position to the first position.

2. The retaining apparatus of the claim 1, wherein the fastener has a head portion and a neck portion, the head portion abuts against an outer side of the gasket and the neck portion extends through the gasket and the tongue.

3. The retaining apparatus of the claim 2, wherein the side wall defines a plane and the head portion is not located in the plane.

4. The retaining apparatus of the claim 1, wherein the gasket defines a through slot, the gasket is secured to the tongue so that the gasket is attached about the tongue.

5. The retaining apparatus of the claim 4, wherein the tongue has an arrow-shaped head portion.

6. The retaining apparatus of the claim 1, wherein a connecting member is attached to the front wall of the tray.

7. The retaining apparatus of the claim 6, wherein a resilient shielding clip provides electro-magnetic interference shielding and comprises of a plurality of claws; wherein the shielding clip is attached to the connecting member, with the plurality of claws.

8. The retaining apparatus of the claim 1, wherein a retaining device is attached to the front wall of the tray.

9. The computer of the claim 1, wherein a first coil spring is located between the base member and the blocking member; when the blocking member moves in the first direction from the first position to the second position, the first coil spring is compressed; and when the blocking member moves in the second direction from the second position to the first position, the first coil spring is released.

10. The computer of the claim 9, wherein a second coil spring is located between the base member and the arm member; when the arm member is locked in the base member, the second coil spring is compressed; and when the arm member is unlocked from the base member, the second coil spring is released.

11. A computer comprising:
    a bracket;
    a data storage device; and
    a retaining apparatus received in the bracket, the retaining apparatus comprising:
       a tray defining a receiving space for receiving the data storage device, the tray comprising a front wall and a side wall, a tongue located on the side wall; and
       a gasket attached to the tongue, and the gasket being capable of absorbing shock from the tray to the data storage device; and
    a retaining device attached to the front wall of the tray capable of retaining the tray to the bracket; wherein the retaining device comprises a base member; an arm member, and a blocking member; the arm member is pivotally attached to the base member; the arm member has a retaining portion to engage with the bracket; the blocking member is movably attached to the base member to block the arm member; the blocking member is movable on the base member between a first position and a second position; in the first position, the arm member is locked in the base member; in the second position, the arm member is unlocked in the base member; the arm member is configured to push the blocking member to move sideways in a first direction from the first position to the second position; and the arm member is locked in the base member and the blocking member is configured to move in a second direction, that is opposite to the first direction, from the second position to the first position.

12. The computer of the claim 11, wherein a fastener is inserted through the gasket and the tongue into the receiving space to retain the data storage device.

13. The computer of the claim 12, wherein the fastener has a head portion and a neck portion, the head portion abuts against an outer side of the gasket and the neck portion is inserted through the gasket and the tongue.

14. The computer of the claim 13, wherein the side wall defines a plane, and the head portion is located outside the plane.

15. The computer of the claim 11, wherein the gasket defines a through slot, the gasket is secured to the tongue, so that the gasket is attached about the tongue.

16. The computer of the claim 15, wherein the tongue has an arrow-shaped head portion.

17. The computer of the claim 11, wherein a connecting member is attached to the front wall of the tray.

18. The computer of the claim 17, wherein a resilient shielding clip provides electro-magnetic interference shielding and comprises of a plurality of claws; and the shielding clip is attached to the connecting member, with the plurality of claws.

19. The computer of the claim 11, wherein a first coil spring is located between the base member and the blocking member; when the blocking member moves in the first direction from the first position to the second position, the first coil spring is compressed; and when the blocking member moves in the second direction from the second position to the first position, the first coil spring is released.

20. The computer of the claim 19, wherein a second coil spring is located between the base member and the arm member; when the arm member is locked in the base member, the second coil spring is compressed; and when the arm member is unlocked from the base member, the second coil spring is released.

* * * * *